US011550589B2

(12) United States Patent
Tabata et al.

(10) Patent No.: US 11,550,589 B2
(45) Date of Patent: Jan. 10, 2023

(54) INHIBITING LOAD INSTRUCTION EXECUTION BASED ON RESERVING A RESOURCE OF A LOAD AND STORE QUEUE BUT FAILING TO RESERVE A RESOURCE OF A STORE DATA QUEUE

(71) Applicant: FUJITSU LIMITED, Kawasaki (JP)

(72) Inventors: Takekazu Tabata, Kawasaki (JP);
Yasunobu Akizuki, Kawasaki (JP);
Sota Sakashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 16/697,244

(22) Filed: Nov. 27, 2019

(65) Prior Publication Data
US 2020/0183694 A1    Jun. 11, 2020

(30) Foreign Application Priority Data
Dec. 6, 2018 (JP) .............................. JP2018-229045

(51) Int. Cl.
*G06F 9/38* (2018.01)
(52) U.S. Cl.
CPC .................. *G06F 9/3834* (2013.01)
(58) Field of Classification Search
CPC .... G06F 9/3834; G06F 9/3838; G06F 9/3836; G06F 9/30043
See application file for complete search history.

(56) References Cited

U.S. PATENT DOCUMENTS

| 5,832,297 | A | * | 11/1998 | Ramagopal | G06F 9/3824 |
| | | | | | 710/5 |
| 6,134,646 | A | * | 10/2000 | Feiste | G06F 9/3834 |
| | | | | | 712/23 |
| 6,701,425 | B1 | * | 3/2004 | Dabbagh | G06F 9/3834 |
| | | | | | 712/218 |
| 6,789,185 | B1 | * | 9/2004 | Gomyo | G06F 9/3017 |
| | | | | | 712/211 |
| 8,918,625 | B1 | * | 12/2014 | O'Bleness | G06F 9/30043 |
| | | | | | 712/216 |
| 2010/0205609 | A1 | * | 8/2010 | Cypher | G06F 12/0859 |
| | | | | | 718/105 |
| 2011/0040955 | A1 | * | 2/2011 | Hooker | G06F 9/3861 |
| | | | | | 712/225 |
| 2014/0325188 | A1 | * | 10/2014 | Ogasawara | G06F 9/384 |
| | | | | | 712/217 |

FOREIGN PATENT DOCUMENTS

| JP | H06-131239 | 5/1994 |
| JP | 2002-366538 | 12/2002 |

* cited by examiner

*Primary Examiner* — Keith E Vicary
(74) *Attorney, Agent, or Firm* — Fujitsu Patent Center

(57) ABSTRACT

A calculation processing apparatus includes a decoder that decodes memory access instructions including a store instruction and a load instruction; a first queue that stores the decoded memory access instructions; a second queue that stores store data related to the store instruction; a storage circuit that stores target address information of the store instruction for which the first queue is reserved but the second queue is not reserved; and an inhibitor that inhibits execution of the load instruction when address information matching target address information of the load instruction is stored in the storage circuit when the load instruction is being processed. This configuration inhibits switching of the order of a store instruction and a load instruction.

6 Claims, 11 Drawing Sheets

FIG.5

| VALID/INVALID | OPERAND REGISTER NUMBER | ROB ID |
|---|---|---|
| 1 (VALID) | 10 | 8 |
| 1 (VALID) | 31 | 11 |
| .. | .. | .. |
| 0 (INVALID) | 30 | 2 |

FIG.6

| VALID/INVALID | ISSUABLE | WAIT FOR RESOURCE RELEASE (INTERLOCK) | INSTRUCTION | FIRST OPERAND REGISTER NUMBER | LDSTQ | STDQ | ..... | ROB ID |
|---|---|---|---|---|---|---|---|---|
| 1 (VALID) | 1 | 0 | LOAD | 10 | 0 | 7 | ..... | 8 |
| 1 (VALID) | 0 | 1 | STORE | 3 | 15 | 7 | ..... | 3 |
| 1 (VALID) | 0 | 1 | STORE | 31 | 1 | 0 | ..... | 11 |
| .. | .. | .. | .. | .. | .. | .. | .. | .. |
| 1 (VALID) | 0 | 0 | LOAD | 3 | 2 | 1 | ..... | 18 |
| 0 (INVALID) | Invalid | Invalid | Invalid | Invalid | Invalid | Invalid | ..... | Invalid |

INHIBITING LOAD INSTRUCTION EXECUTION BASED ON RESERVING A RESOURCE OF A LOAD AND STORE QUEUE BUT FAILING TO RESERVE A RESOURCE OF A STORE DATA QUEUE

CROSS-REFERENCE TO RELATED APPLICATION

This application is based upon and claims the benefit of priority of the prior Japanese Patent application No. 2018-229045, filed on Dec. 6, 2018, the entire contents of which are incorporated herein by reference.

FIELD

The present invention relates to a calculation processing apparatus and a method of controlling a calculation processing apparatus.

BACKGROUND

A processor serving as a calculation processing apparatus of an information processing apparatus includes one or more processor cores.

A processor core includes an instruction cache, an instruction buffer, a decoder, a reservation station, a calculation executor, and a load/store unit. A processor core performs the following process in executing an instruction.

An instruction is stored in the instruction cache, and the read instruction is stored into the instruction buffer and sequentially sent to the decoder. The decoder performs instruction interpretation and inserts the instruction to the reservation station.

The reservation station includes an RSE (Reservation Station for Execution) to accumulate calculation instructions and an RSA (Reservation Station for Address) to accumulate the load/store instructions.

Each reservation station determines whether to insert an instruction from the reservation station to a calculator. This insertion of an instruction is executed in an out-of-order fashion in which one or more instructions that can be processed are preferentially processed not depending on the order of the arrangement of the instructions, with the intention of improving the efficiency in using the calculator. A load instruction and a store instruction selected by the RSA are executed by the address generating calculator.

The RSA sends the number of the fixed-point register (GPR) to the calculation executor for the data to be used in the address calculation. The data of the fixed-point register referenced on the basis of this register number is sent to the address-generating calculator and used for executing the calculation. The output of the address generation calculator is the address of the memory to be accessed by a load instruction or a store instruction. (See following Patent Document 1).

The RSA issues a request for loading or storing to the load/store unit in agreement with the timing when address calculation is carried out. The load/store unit receives the request and executes the load or store instruction, accumulating the instruction into a Load & Store Queue (LDSTQ) that accumulates load and store instructions. The RSA releases the entry in which the instruction has been stored at the timing of issuing the request to the load/store unit, and notifies the release to the decoder (See following Patent Documents 1 and 2).

Upon completion of the executing load instruction, the load/store unit stores the result of reading from the memory into the fixed-point register, and releases the LDSTQ. If the load instruction is not completed due to, for example, a cache miss, the request is aborted and re-issued from the LDSTQ.

[Patent Document 1] Japanese Laid-open Patent Publication No. 2002-366538

[Patent Document 2] Japanese Laid-open Patent Publication No. HEI 6-131239

However, in execution of an instruction sequence that stores data in a cache line and then loads data from the same cache line, such a conventional processor has a possibility of executing the loading before the storing due to the out-of-order control.

In this case, since data is read from the cache memory before the storing is executed, wrong data is returned as the result. The LDSTQ does not grasp that a store instruction exists before the load instruction and these instructions refer to the same address unless the instructions are issued from the RSA and the LDSTQ receives the request after the address calculation. The control that the LDSTQ waits for the previous instruction from RSA is almost the same as disabling the out-of-order control, and is not carried out from the viewpoint of performance.

Therefore, the load instruction is released from LDSTQ on the premises that the execution of the load instruction succeeded. Although the load instruction needs to be reexecuted, whether the reexecution is required is revealed when the store instruction reaches the LDSTQ. Consequently, the reexecution will begin with the ensuing instruction by being triggered by the store instruction. Hence, since the instructions that have been released from the RSA or the LDSTQ will be reexecuted, the instructions start with instruction fetching again. The time for this reexecution problematically affects the degradation of the performance.

SUMMARY

There is provided a calculation processing apparatus including: a decoder that decodes memory access instructions including a store instruction and a load instruction; a first queue that stores the decoded memory access instructions; a second queue that stores store data related to the store instruction; a storage circuit that stores target address information of the store instruction for which the first queue is reserved but the second queue is not reserved; and an inhibitor that inhibits execution of the load instruction if address information matching target address information of the load instruction is stored in the storage circuit when the load instruction is being processed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of information held by an SML in a processor core of an example of the embodiment;

FIG. 6 is a diagram illustrating an example of the configuration of an entry of an RSA of a processor core of an example of the embodiment;

DESCRIPTION OF EMBODIMENT(S)

Hereinafter, the present calculation processing apparatus and a method for controlling the present calculation processing apparatus according to an embodiment will now be detailed with reference to the accompanying drawings. However, the following embodiment is exemplary and there is no intention to exclude various modifications and applications of techniques not explicitly referred in the embodiment. In other words, various changes and modifications can be suggested without departing from the scope of the embodiment (e.g., combining the embodiments and modifications). The drawings do not illustrate therein all the functions and elements included in the embodiments and may include additional functions and elements to those illustrated in the accompanying drawings.

(I) Related Technique

Figure 1:
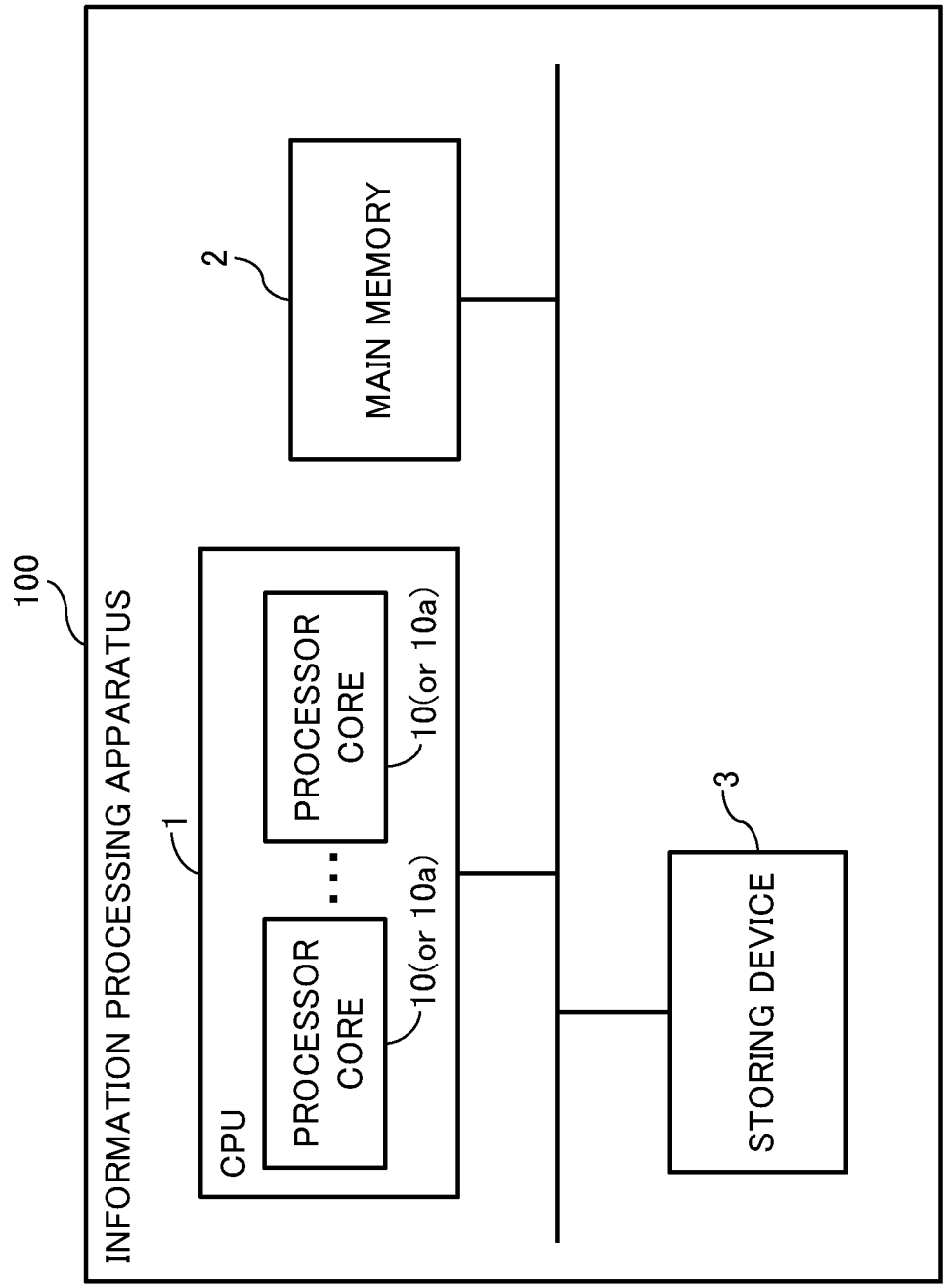
FIG. 1 is a diagram illustrating an example of the configuration of an information processing apparatus.

FIG. 1 is a diagram illustrating an example of the configuration of an information processing apparatus.

The information processing apparatus 100 includes, for example, a Central Processing Unit (CPU) 1, a main memory 2, and a storing device 3. The CPU 1, the main memory 2, and the storing device 3 are connected via buses and communicate with each other. The CPU 1 includes one or more processor cores 10a (10). Hereinafter, the CPU 1 is sometimes referred to as processor 1. A processor core 10, 10a corresponds to an example of a calculation processing apparatus.

In the main memory 2, the instruction sequence contained in a process generated by expanding the program is stored. An instruction sequence includes calculation instructions to execute, for example, addition and subtraction, and load instructions to read data, and store instructions to write data, for example.

These load instructions and store instructions are memory access instructions that make accesses to the main memory 2. Hereinafter, load instructions and store instructions are sometimes collectively referred to as load/store instructions.

Figure 2:
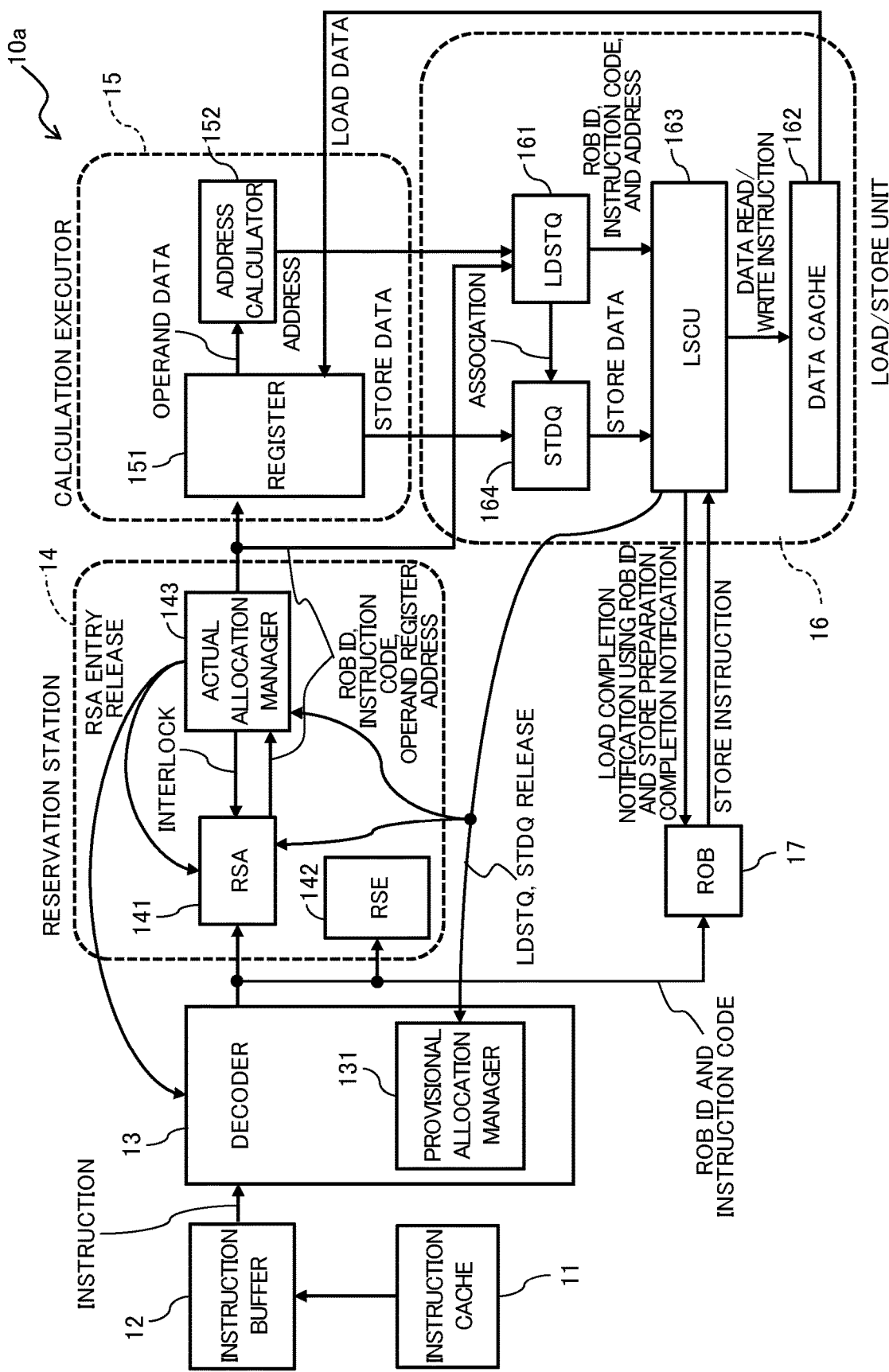
FIG. 2 is a diagram illustrating an example of the configuration of a processor core related to a processor core according to an example of an embodiment.

FIG. 2 is a diagram illustrating an example of the configuration of the processor core 10a related to a processor core according to an example of the embodiment.

The processor core 10a includes an instruction cache 11, an instruction buffer 12, a decoder 13, a reservation station 14, a calculation executor 15, a load/store unit 16, and a Re-Order Buffer (ROB) 17.

The processor core 10a is a calculation processing apparatus that performs calculation processing, and one or more processor cores 10a are provided to the CPU 1.

The decoder 13 interprets an instruction and allocates resources to queues that accumulate various instructions. A manner of allocating resources by the decoder 13 will be discussed below.

The reservation station 14 determines whether to insert an instruction into the calculation executor 15. The reservation station 14 accumulates instructions interpreted by the decoder 13 and issues the accumulated instructions to the load/store unit 16 or calculation executor 15, arbitrating the preferences of the instructions.

The reservation station 14 includes an RSA 141, an RSE 142, and an actual allocation manager 143. The RSA 141 accumulates load instructions and store instructions, and the RSE 142 accumulates calculation instructions.

The RSA 141 notifies the actual allocation manager 143 of the instruction code, the operand register address, and Re-Order Buffer ID (ROB ID) of the load/store instruction to be processed.

The actual allocation manager 143 has information about the number of entries in the LDSTQ 161 in advance. The actual allocation manager 143 receives an instruction ID of a load/store instruction from the RSA 141. The actual allocation manager 143 receives an input of an LDSTQ cancel signal from an LSCU (Load Store Control Unit) 163 to be detailed below.

The actual allocation manager 143 obtains the number of load/store instructions held by the LDSTQ 161 from the number of load/store instructions that the actual allocation manager 143 outputs to the LDSTQ 161 and an LDSTQ release signals input from the LSCU 163. Then the actual allocation manager 143 determines whether or not the number of load/store instructions held by the LDSTQ 161 is less than the number of entries of the LDSTQ 161.

If the number of load/store instructions held by the LDSTQ 161 is less than the number of entries of the LDSTQ 161, the actual allocation manager 143 outputs the instruction code of the load/store instruction input from the RSA 141 to the calculation executor 15 and the LDSTQ 161.

The actual allocation manager 143 also notifies the calculation executor 15 and the LDSTQ 161 of the operand register address and the ROB ID as well as the instruction code of the load/store instruction.

On the other hand, if the number of load/store instructions held by the LDSTQ 161 is equal to or larger than the number of entries of the LDSTQ 161, the actual allocation manager 143 determines that the LDSTQ 161 is full, i.e., the LDSTQ 161 does not have the space to store the load/store instruction input from the RSA 141 (has no empty space).

If the LDSTQ 161 is full (has no empty space), the actual allocation manager 143 returns the load/store instruction input from the RSA 141 to the RSA 141 and also sends an interlock signal to the RSA 141. Returning a load/store instruction input from the RSA 141 to the RSA 141 means that the actual allocation manager 143 discards the load/store instruction and requests the RSA 141 to retransmit the load/store instruction.

The RSE 142 sends the calculation executor 15 a fixed-point register number to hold the data to be used for fixed-point calculation. The RSA 141 also sends the calculation executor 15 the fixed-point register number to be used for loading or storing data.

The calculation executor 15 includes a register 151 and an address calculator 152.

The register 151 stores data related to execution of calculation. For example, the register 151 stores an ROB ID, an instruction code, and an operand register address that are notified by the actual allocation manager 143. Load data and store data are stored into register 151.

The address calculator 152 carries out address calculation to execute a load/store instruction selected by the RSA 141. The address calculator 152 obtains operand data from the register 151. The address calculator 152 then generates (calculates) the address of the main memory 2 to be accessed in execution of the load/store instruction and outputs the generated address to the LDSTQ 161. The RSA 141 outputs a load instruction or a store instruction to the load/store unit 16 in agreement with the timing when address generation is carried out by the address calculator 152. The calculation executor 15 and the load/store unit 16 correspond to a processor that processes memory access instructions.

The ROB 17 controls the instructions interpreted by the decoder 13 to be accomplished in the order of being programmed. All the instructions being decoded by decoder 13 and being waiting for being completed are registered in the ROB 17. Each instruction to be registered into the ROB 17 is given a unique ROB ID. An ROB ID may be set by the decoder 13.

The ROB 17 issues a store instruction to the LSCU 163 of the load/store unit 16.

The load/store unit 16 makes a memory access to the main memory 2. The load/store unit 16 includes the LDSTQ 161, a data cache 162, the LSCU 163, and a Store Data Queue (STDQ) 164.

The data cache 162 temporarily stores data read from the main memory 2 and data to be written into the main memory 2.

The LDSTQ 161 is a queue that accumulates load instructions and store instructions issued by the RSA 141 and the target addresses to be accessed in execution of the issued instructions. The STDQ 164 is a queue that accumulates the store data of store instructions.

The LSCU 163 controls memory accesses that the load/store unit 16 makes to main memory 2. The LSCU 163 obtains an ROB ID, an instruction code, and an address from the LDSTQ 161. The LSCU 163 also obtains the store data of a store instruction from the STDQ 164 and stores the obtained data into the data cache 162. The LSCU 163 issues a data read instruction or a data write instruction using the above obtained information.

The LSCU 163 arbitrates the instructions accumulated in the LDSTQ 161. When a store instruction is registered into the LDSTQ 161, the LSCU 163 associates the LDSTQ 161 with the STDQ 164.

The LSCU 163 sends the ROB 17 a load completion notification using the ROB ID. In response to a store instruction from the ROB 17, the LSCU 163 notifies the ROB 17 of a store preparation completion notification.

When the load/store unit 16 executes a load/store instruction and the LDSTQ 161 and STDQ 164 come to be releasable as a result of the completion of the execution, the LSCU 163 sends the decoder 13 and the reservation station 14 a release notification. The load/store unit 16 corresponds to a processor that processes memory access instructions.

The RSA 141 has a function to determine whether the actual resource of the LDSTQ 161 can be reserved for a load instruction or a store instruction selected from the multiple entries. If the selected instruction is a store instruction, the RSA 141 determines whether the actual resource of the STDQ 164 can be reserved. The RSA 141 has a function to interlock, if either resource is unable to be reserved as a result of the determinations, the corresponding entry in the RSA 141 until the resource is released.

The decoder 13 has a function to speculatively allocate resources of the LDSTQ 161 and the STDQ 164.

The decoder 13 obtains an instruction from the instruction buffer 12 and decodes the obtained instruction. The decoder 13 manages the number of load/store instructions to be output to the load/store unit 16 and provisionally allocates the LDSTQ 161 to a load/store instruction. Here, provisional allocation refers to the allocation of virtual entries, which are identification information obtained by virtually increasing the number of entries of the LDSTQ 161, to load/store instructions. In some cases, provisional allocation is referred to as speculative allocation.

The decoder 13 reads an instruction stored in the instruction cache 11 and stores the read instruction into the instruction buffer 12. The decoder 13 receives an input of the instruction stored in the instruction buffer 12. The decoder 13 then interprets the obtained instruction and determines whether the instruction is a calculation instruction or a load/store instruction.

The decoder 13 includes a provisional, allocation manager 131. As will be detailed below, in cases where the provisional allocation manager 131 determines that a load/store instruction can be output, the decoder 13 provisionally allocates an entry of the LDSTQ 161 to the load/store instruction by allocating a provisional LDSTQ number to the load/store instruction.

Here, a provisional LDSTQ number is a number used to provisionally allocate an entry of the LDSTQ 161 to a load/store instruction. In the present embodiment, a provisional LDSTQ number is represented by a combination of a group number and a LDSTQ number representing an entry of the actual LDSTQ 161. By setting a provisional. LDSTQ number in this way, a LDSTQ number can be easily generated from the provisional LDSTQ number, and provisional allocation of an entry of the LDSTQ 161 to a load/store instruction can be easily changed to the actual allocation. Alternatively, a provisional LDSTQ number may be replaced with another number as far as the number that can determine the processing order of load/store instructions and a mechanism to convert the number into a LDSTQ number can be prepared.

Then, the decoder 13 outputs the load/store instruction to which the provisional LDSTQ number is allocated to the RSA 141 of the reservation station 14. In cases where the instruction is a calculation instruction, the decoder 13 sequentially outputs the obtained calculation instruction to the RSE 142 of the reservation station 14.

Here, decoder 13 outputs (issues) the instructions in the order in which the instructions have been issued (in-order). For the above, for example, in cases where the output of an instruction is in a standby status, the decoder 13 also waits for the output of the instructions subsequent to the instruction that is made to be stand-by in being output.

The provisional allocation manager 131 counts the number of load/store instructions output from the decoder 13.

The provisional allocation manager 131 further obtains an LDSTQ release signal from the LDSTQ 161. An LDSTQ release signal is a signal output from the LDSTQ 161 when a load/store instruction is output from an entry in the LDSTQ 161 where the load/store instruction is stored to the data cache 162 and the entry is released.

Here, the LDSTQ 161 has an upper limit of storable load/store instructions. Hereinafter, the upper limit of storable load/store instructions in the LDSTQ 161 is referred to as an entry number of the LDSTQ 161. That is, an LDSTQ release signal is a signal indicating that an entry of the LDSTQ 161 has been released.

The provisional allocation manager 131 has in advance an upper limit number of issuing instructions larger than the entry number of the LDSTQ 161. For example, the provisional allocation manager 131 stores the number four times the entry number of the LDSTQ 161 as the upper limit number of issuing instructions. Any number can be used as the upper limit number of issuing instructions as far as the number is larger than the entry number of LDSTQ 161. The larger upper limit of issuing instructions enhances the out-of-order performance of the RSE 141 and the RSA 142. The upper limit of the number of provisional LDSTQ numbers that the decoder 13 can issue is this upper limit of issuing instructions.

The provisional allocation manager 131 obtains the residual number of load/store instructions, which is the number of load/store instructions that have not yet been output from the LDSTQ 161 among the load/store instructions output by the decoder 13. The provisional allocation manager 131 determines whether or not the residual number of load/store instructions is less than the upper limit of issuing instructions.

In cases where the residual number of load/store instructions is equal to or more than the upper limit of issuing instructions, the provisional allocation manager 131 postpones outputting load/store instructions from the decoder 13. On the other hand, in cases where the residual number of load/store instructions is less than the upper limit of issuing instructions, the provisional allocation manager 131 determines whether or not a release signal of the RSA 141 indicating that the load/store instruction has been output is obtained from the RSA 141.

When receiving a release signal of RSA 141, the provisional allocation manager 131 determines that an empty space to store a load/store instruction exists in the RSA 141. Then, in cases where an empty space to store a load/store instruction exists in the RSA 141, the provisional allocation manager 131 notifies the decoder 13 that a load/store instruction can be output, and causes the decoder 13 to output a load/store instruction from the decoder 13 to the RSA 141 of the reservation station 14.

Figure 3:
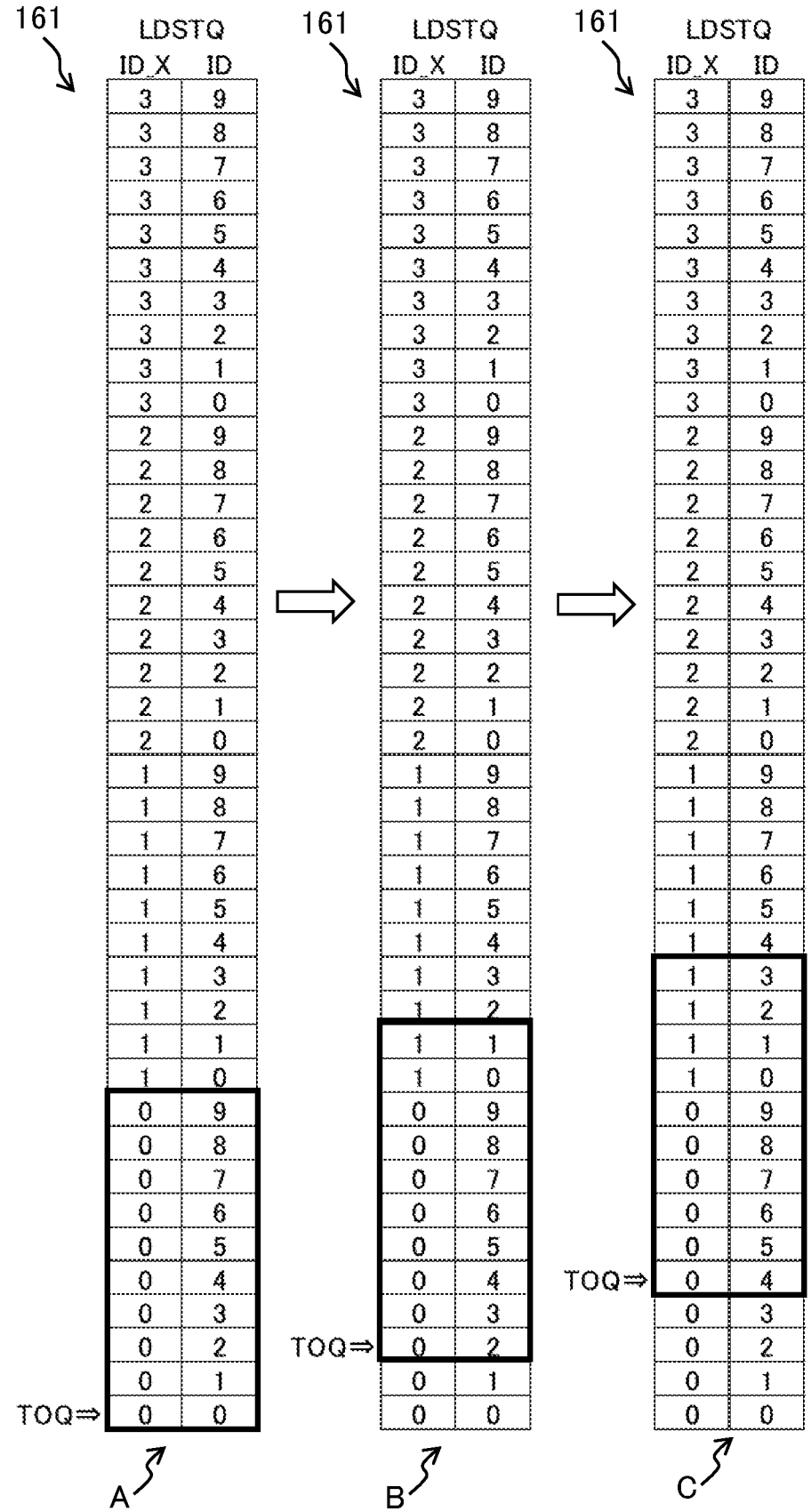
FIG. 3 is a diagram illustrating a method for managing an LDSTQ of a processor core related to processor core as an example of the embodiment.

FIG. 3 is a diagram illustrating a method for managing the LDSTQ 161 of the processor core 10a related to a processor core of an example of the embodiment.

The LDSTQ 161 indicated by reference symbols A to C in FIG. 3 actually consists of 10 entries with IDs 0 to 9, and is virtually extended by indicating these IDs attached with X_IDs (0 to 3) and is managed on the assumption of including 40 entries.

The reference symbol A indicates the using state of the LDSTQ 161 in the initial, state. The reference symbol B indicates the using state of the LDSTQ 161 at a certain time point, and the reference symbol C indicates the using state of the LDSTQ 161 at a time point when a predetermined time has passed since the state indicated by the reference symbol B.

The term "TOQ (Top of Queue)" indicates the position (LDSTQ number) of the leading load/store instruction among the load/store instructions stored in the LDSTQ 161.

The actual LDSTQ 161 has, for example, 10 entries. Under the initial state, as depicted by the reference symbol A, the part of ID_X=0 and ten entries from ID=0 enclosed in a thick frame is combinations of an ID_X and an ID that can actually be used.

The actual allocation manager 143 determines whether or not the LDSTQ 161 has an empty space by checking whether or not the ID and ID_X allocated by the decoder 13 are inside the thick frame.

Since the TOQ is updated by releasing the LDSTQ 161, releasing two entries from the state indicated by the reference symbol A, for example, shifts the state into to the state indicated by the reference symbol B. Since the release of an entry of the LDSTQ 161 is carried out in the in-order fashion and starts from the TOQ, the TOQ shifted to the two-entry ahead, i.e., ID_X=0, ID=2. The shift of the TOQ accompanies a shift of the thick frame representing the valid 10 entries by 2 entries. In relation to the same ID=0, the entry of ID_X=0, which has been valid in the state indicated by the reference symbol A, comes to be invalid under the state indicated by the reference symbol B and in turn, the entry of ID_X=1 comes to be valid.

The allocation of the ID and the ID_X of the LDSTQ 161 is accomplished by the provisional allocation manager 131, and the ID and the ID_X are allocated in the numerical order. The ID and the ID_X are updated cyclically. In other words, the ID and the ID_X are each wrap around. For example, if the ID exceeds 9 (since this example has 10 entries), the next ID is 0 and ID_X is incremented by one.

In the processor core 10a configured as the above, instruction reads from instruction cache 11 are stored in the instruction buffer 12 and sent sequentially to decoder 13. The decoder 13 interprets an instruction and inserts the instruction to the reservation station 14.

At this time, the provisional allocation manager 131 speculatively (virtually) allocates resources of the LDSTQ 161 and the STDQ 164 to the instruction. For speculative allocation of the LDSTQ 161 and the STDQ 164, sequential. IDs having a size sufficiently larger than the actual sizes of the LDSTQ 161 and the STDQ 164 are used.

That is, speculative LDSTQ 161 and STDQ 164 that fail within a range having the same widths as the sizes of the actual LDSTQ 161 and the STDQ 164 are regarded as the actually reservable LDSTQ 161 and STDQ 164.

Speculative LDSTQ 161 and STDQ 164 outside of the ranges are unable to reserve resources. When the actual resource is released, these ranges are shifted, keeping their widths.

The insertion of an instruction from the reservation station 14 to the calculation executor 15 is determined by the RSA 141 or the RSE 142. The insertion of instructions in the out-of-order fashion intends to enhance the using efficiency of the address calculator 152.

The actual allocation manager 143 allocates the resource of the LDSTQ 161 in cases where the instruction selected in the RSA 141 is a load instruction. In contrast, in cases where the instruction selected in the RSA 141 is a store instruction, the actual allocation manager 143 allocates the resources of the LDSTQ 161 and the STDQ 164.

If the resource allocation fails, the load instruction and the store instruction are returned to the RSA 141 and are interlocked until the resources are released. If the resource allocation is successful, the RSA 141 sends the number of the fixed-point register, e.g., the first operand register number and the second operand register number, to the calculation executor 15 for the data to be used in the address calculation.

The operand data of the fixed-point register directed by these register numbers are sent to address calculator 152 to be used in the address calculation. The output of the address calculator 152 is the addresses of the main memory 2 to be accessed by the load instruction or the store instruction.

The RSA 141 issues a load or store request to load/store unit 16 in agreement with the timing when the address calculation is performed. At the timing when the request is issued to the load/store unit 16, the RSA 141 releases the entry that has stored the corresponding instruction and sends the notification of the release to the decoder 13.

Upon receipt of the request from the RSA 141, the load/store unit 16 stores the load/store instruction into the LDSTQ 161, and, if the load/store instruction is a store instruction, associates the instruction with the STDQ 164. At the same time, the load/store unit 16 makes a memory access and executes a flow of procedural steps for preparation of loading or storing while arbitrating the execution order in the LSCU 163.

If the instruction is not completed due to, for example, a cache miss, the load/store unit 16 aborts the request, arbitrates in the LSCU 163, and the request is reissued from the LDSTQ 161.

If the instruction being executed is a load instruction, the LSCU 163 stores the result of reading the main memory 2 into the register (fixed-point register) 151 when completion of reading the data from main memory 2. The LSCU 163 also releases the LDSTQ 161 having been used by the instruction and sends the notification of the release to the decoder 13 and the RSA 141 to notify the ROB 17 that the instruction is ready to be completed.

On the other hand, in cases where the instruction being executed is a store instruction, the LSCU 163 performs a flow of preparing, such as address conversion, and notifies the ROB 17 that preparation for completion of the instruction when the store data is stored in the STDQ 164 and the store data is ready to be written into the main memory 2.

Storing of the store data into the STDQ 164 may be performed in the storing in which an operand register is read along with the address of the store instruction from the RSA 141 and the operand register is registered into the STDQ 164.

In addition, the storing of the store data into the STDQ 164 may be performed by an entry in the RSE 142 only for registration into the STDQ 164 which entry is registered into the RSA 141 at the same time when the decoder 13 interprets the store instruction. In such cases, since the entry for the store data registered in the RSE 142 is speculatively allocated to the STDQ 164, the same resource allocation and the same interlocking when resource allocation fails as those performed by the RSA 141 are carried out.

The ROB 17 completes the instructions in the order of the programs. In cases where the load/store instruction is a load instruction, the ROB 17 fixes the result of the fixed-point register into which the result of the read from the memory has been written. In cases where the load/store instruction is a store instruction, data registered in the STDQ 164 is written into the address on the main memory 2 registered in the LDSTQ 161, using the corresponding LDSTQ 161 and the STDQ 164. When the LDSTQ 161 and the STDQ 164 come to be releasable, the LSCU 163 notifies the decoder 13 and the RSA 141 of this.

Upon receipt of a release signal, the RSA 141 offsets the usable ranges of the speculative LDSTQ 161 and the speculative STDQ 164, and cancels interlocking on an instruction that newly comes to be able to use the LDSTQ 161 and the STDQ 164.

Load instructions, which read data from the main memory 2, are generally known to be more frequent than store instructions, which write data into main memory 2. Furthermore, as compared to a load instruction, which holds the reading address of the main memory 2, a store instruction needs to hold data for writing into the main memory 2 in addition to the writing address to the main memory 2, and consequently needs a lot of resources for speculative execution.

Therefore, in order to optimize the amount of circuits, the processor 1 that adopts the out-of-order fashion includes the LDSTQ 161 for the addresses to be accessed by load instructions and store instructions and the STDQ 164 for the data to be written into the memory by the store instructions separately from each other. The LDSTQ 161 and the STDQ 164 are configured to have structures with different numbers of entries in the most cases.

Because of the characteristics of frequencies of load instructions and store instructions, the STDQ 164 often uses a structure that can hold entries much smaller in number than the LDSTQ 161.

With this configuration of the processor 1, when the decoder 13 speculatively allocates the LDSTQ 161 and the STDQ 164, the load instruction is issued from the RSA 141 even if the usage of the resource of the STDQ 164 increases due to the out-of-order execution function of the processor 1, and consequently, the load/store unit 16 is capable of carrying out memory access.

In cases where the decoder 13 does not speculatively allocate the LDSTQ 161 and the STDQ 164, the decoder 13 is interlocked until the actual STDQ 164 is reserved, and subsequent load instruction not using the STDQ 164 is inhibited from being issued.

In the configurations that involves speculative allocation of the LDSTQ 161 and the STDQ 164, a store instruction may stay in the RSA 141 for a long time period by waiting until the actual resources of the STDQ 164 becomes to be reservable.

This means that, if the STDQ 164 has a resource smaller than that of the LDSTQ 161, a subsequent load instruction is more likely to be issued earlier than the preceding store instruction due to the function of the out-of-order.

The processor 1 adopting the out-of-order fashion expects this behavior, and can hide the latency of the main memory 2 by processing a load instruction that can be precedingly issued.

On the other hand, even if the preceding store instruction on the program and the subsequent load instruction are executed in random order, the instructions need to behave in the program as if being executed in order of the program. That is, even if the load instruction existing subsequently to the store instruction precedingly existing on the program as the above may be executed, the final result must be consistent.

This consistency is particularly significant in cases where multiple processor cores 10a are provided. In cases where the addresses of the preceding store instruction and the subsequent load instruction, the order of which is switched, on the program match each other, which means the cases where the preceding store instruction that originally exists on the program writes the data into the main memory 2 and the load instruction then reads the written data, the data read by the load instruction is incorrect unless the store instruction has finished the writing.

In cases where such a switch of the order occurs between the store instruction and the load instruction, the processor 1 performs a rollback that undoes the execution of at least the subsequent load instruction and the subsequent instructions to the load instruction when the store instruction is completed in order to maintain the consistency. Then the processor 1 retries the subsequent instructions including the load instruction.

This rollback imposes considerable penalty in performance and also degrades the power efficiency because all instructions speculatively executed are to be reexecuted.

Speculatively allocating the LDSTQ 161 and the STDQ 164 in the decoder 13 has a high risk of causing the above rollback described above than cases where interlocking the LDSTQ 161 and the STDQ 164 without the speculatively allocating by the decoder 13.

Figure 4:
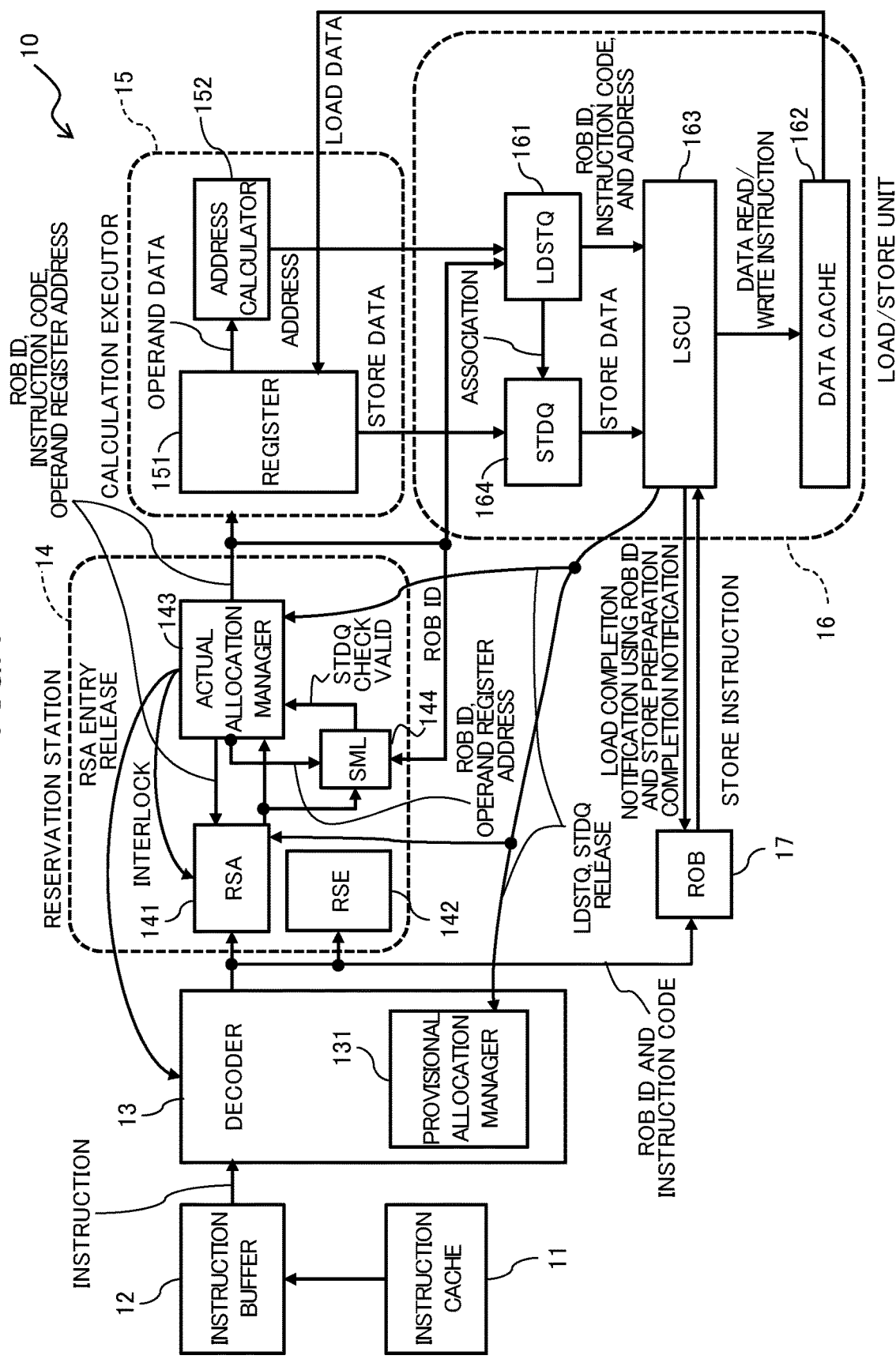
FIG. 4 is a diagram illustrating an example of the configuration of a processor core related to processor core of an example of the embodiment.

(II) Embodiment (A) Configuration:

FIG. 4 is a diagram illustrating a configuration of the processor core 10 related to processor core as an example of the embodiment.

The processor core 10, serving as one example of the embodiment, is provided in the CPU 1 of the information processing apparatus 100 likewise the processor core 10a illustrated in FIG. 2. The processor core 10 includes a Store Data Queue Miss List (SML) 144 in addition to the processor core 10a illustrated in FIG. 2.

The processor core 10 has a function to compare a first operand register number of the SML 144 in which load instructions are accumulated with the first operand register number of a load instruction, and if the numbers match, interlock the corresponding entry in the RSA 141 until the resource of the STDQ 164 is released. All the decoded instructions waiting for completion are registered in the ROB 17 and provided with respective unique ROB IDs.

The remaining parts are configured the same as the processor core 10a illustrated in FIG. 2. Like reference numbers in the drawing designate the same or similar parts and elements already described, so repetitious description is omitted here.

The LDSTQ 161 corresponds to a first queue that stores decoded memory access instructions, and the STDQ 164 corresponds to a second queue that stores store data related to the store instructions.

In the processor core 10 illustrated in FIG. 4, in cases where a subsequent load instruction whose address matches that of the preceding store instruction exists, the rollback that occurs when the load instruction accesses the memory earlier is suppressed, and another load instruction that can reserve actual resource is speculatively executed. In processor core 10, these effects are achieved with a small circuitry amount.

The present processor core 10 focuses on the characteristics of the program in order to prevent a subsequent load instruction from being registered into the LDSTQ 161 and being accessed by the load/store unit 16 before the preceding store instruction having the same access destination address as the load instruction is registered into the LDSTQ 161.

The operation of, by the subsequent load instruction, reading and using the data written into main memory 2 by the preceding store instruction is frequently performed in the two types of operations explained in the following (1) and (2).

(1) A spill-fill operation, in which register data is evacuated to the main memory and is used for another purpose in case where registers run short during the execution of the program when the register shortage is resolved or the actual evacuated data is needed, the program again reads the register data through the load instruction.

(2) An operation in which, when a subroutine is called and returned, the data in the register is evacuated to the main memory to protect the data used by the register to be used by a call destination of the subroutine or the data having been used by the call source of the subroutine, and then the evacuated data is restored when the subroutine is returned.

When these operations are to be performed, as the first operand register used to calculate the addresses of the load instruction and the store instruction, a particular same register, such as a stack pointer or a frame pointer, is used. That is, if the first operand register of the preceding store instruction which is issued from the RSA 141 and fails to reserve an actual resource of the STDQ 164 and that of the subsequent load instruction match, the load instruction has a possibility of reading the data stored by the store instruction. Such a load instruction is preferably executed after the preceding store instruction successfully reserves the STDQ 164.

The SML 144 has a queue structure that accumulates the first operand register number for address calculation and the identification information (e.g., an ROB ID) unique to the instruction being executed when a store instruction reserves the actual resources of the LDSTQ 161 but does not reserve the actual resource of the STDQ 164. The SML 144 corresponds to a storage circuit that stores address information (first operand register number, ROB ID) related to a store instruction has succeeded in reserving the LDSTQ 161 (first queue) but does not reserve the STDQ 164 (second queue).

FIG. 5 is a diagram illustrating the data held by the SML 144 in the processor core 10 as an example of the embodiment.

In the embodiment illustrated in FIG. 5, the SML 144 sets valid/invalid information for each combination (entry) of a first operand register number (operand register number) and an ROB ID. The SML 144 has one or more entries.

The valid/invalid information is a flag indicating a state of whether or not the STDQ 164 is reserved. In the examples illustrated in FIG. 5, the value "1 (valid)" indicates a state where the STDQ 164 is not reserved, and the value "0 (invalid)" indicates a state where the STDQ 164 is reserved.

When a load instruction is being processed, a determination is made as to whether or not the first operand register number (address information) related to the load instruction is registered in an entry of the SML 144 (storage unit). If the first operand register number (address information) related to the load instruction is registered in an entry of the SML 144 (storage unit), as a result of this determination, a notification (actual STDQ check execution valid signal) is sent to the actual allocation manager 143.

Besides, the decoder 13 in the present processor core 10 has a function to provide the load instruction with the resource information of the STDQ 164 allocated to the store instruction decoded the latest.

In cases where a store instruction is issued from the reservation station 14, then reserves the actual resources of the LDSTQ 161, but does not reserve the STDQ 164, the actual allocation manager 143 cancels the execution of the store instruction and interlocks the store instruction until the resource (e.g., STDQ 164) is released in reservation station 14.

At the same time, the first operand register number for the address calculation of the store instruction and the ROB ID unique to an instruction being executed in the out-of-order fashion are registered in the SML 144, and the valid/invalid information indicating a state where the STDQ 164 is not reserved is held in the SML 144 in association with the first operand register number and the ROB ID.

The actual allocation manager 143 functions as an inhibitor that inhibits the execution of a load instruction when address information matching the target address information of the load instruction is stored into the SML 144 while the load instruction is being processed.

In general, the processor core 10 that adopts out-of-order holds an ROB ID unique to an instruction being executed for each instruction, and manages the execution status and execution completion of the instruction, using this ROB ID.

The entries registered in the SML 144 are used to inhibit the subsequent load instruction. An ID unique to an instruction being executed is used to invalidate a registered entry in cases where the resource for a store instruction of the registered entry is reserved.

The first operand register number is used to selectively inhibit the subsequent load instruction. When the resource is released and interlocking on the store instruction is cancelled, the reservation station 14 issues the store instruction again.

If the store instruction successfully reserves the STQ 161 and the STDQ 164 at the same time when the store instruction is executed, the ROB ID of the store instruction is sent to the SML 144 to be matched with the ROB ID of the entry held by the SML 144. As a result of the matching, if the entry is present in the SML 144, the corresponding valid/invalid information is marked with "0", representing invalidity. That is, the ROB ID is used to invalidate the entry registered in the SML 144 when the resource for the store instruction of the same entry is reserved.

On the other hand, when a load instruction is issued from the reservation station 14, the actual allocation manager 143 checks whether the first operand register number used by the load instruction matches the first operand register numbers for all the entries the valid/invalid information of which holds the value "1" representing validity among the entire information held in the SML 144.

If a matching entry exists, the actual allocation manager 143 checks whether the STDQ 164 provided by decoder 13 is reservable. If the STDQ 164 is not reservable, the execution of the load instruction is canceled and the actual allocation manager 143 interlocks the load instruction until the resource is released by the reservation station 14.

If the STDQ 164 is reservable, the load instruction is normally executed. The load instruction does not reserve the STDQ 164 in this process. However, the check as to whether the STDQ 164 is reservable is made to check the possibility that a store instruction that needs to be executed before the load instruction is interlocked by the reservation station 14.

If an instruction that registers a valid entry of the SML 144 is a store instruction subsequent to the load instruction, overtaking that causes a rollback does not occur. To improve the performance, such a load instruction needs to be speculatively executed.

Next, allocation of the LDSTQ 161 and the STDQ 164 and interlocking control in the RSA 141 of the present processor core 10 will now be described.

First, when a load instruction is decoded during decoding, the decoder 13 allocates a speculative LDSTQ 161 to the load instruction and provides the load instruction with the number of a speculative STDQ 164 number having been allocated to a store instruction decoded prior to the decoding of the load instruction. The decoded load instruction and the decoded store instruction are registered in the RSA 141.

FIG. 6 is a diagram illustrating an example of the configuration of an entry in the RSA 141 of the processor core 10 according to an example of the embodiment.

In the RSA 141, as illustrated in FIG. 6, pieces of information such as valid/invalid, issuable, waiting for resource release (interlock), instruction, first operand register number, LDSTQ, STDQ, and ROB ID are associated with one another.

In FIG. 6, "Invalid" represents a value that is registered in the reservation station 14 but has no significance.

The RSA according to the conventional scheme has used the STDQ field only by a store instruction, and has set "Invalid" in the STDQ field for a load instruction.

In contrast, the present processor core 10 sets, as illustrated in FIG. 6, the values "7" and "I" representing the numbers of the STDQ 164 in the STDQ field for load instructions. This means that the STDQ fields, which has been used only by a store instruction in the conventional scheme, is also used by a load instruction. As the above, the RSA 141 of the present processor core 10 manages, in the STDQ field, the number of the speculative STDQ 164 of the store instruction decoded the most recently.

Figure 7:
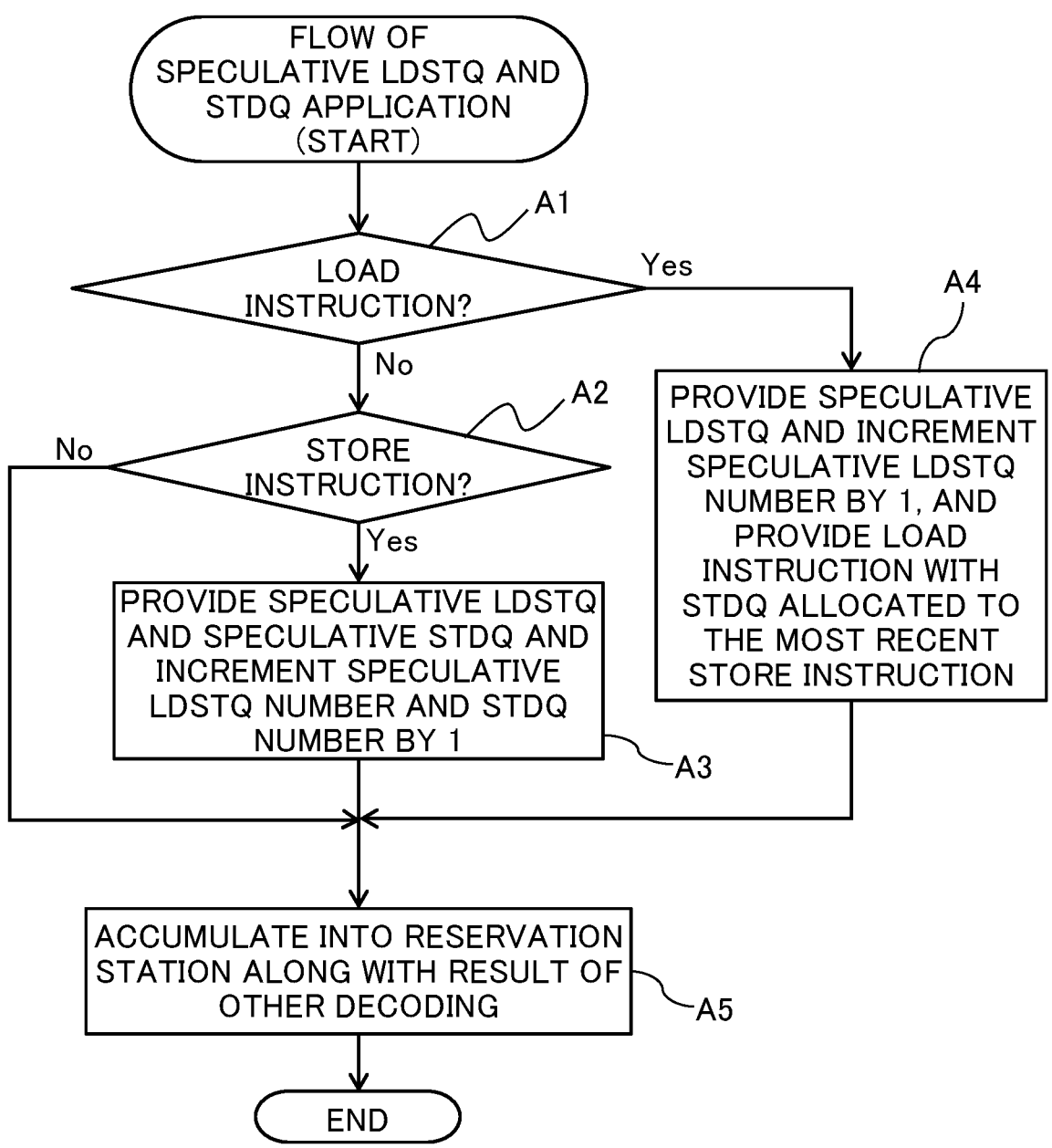
FIG. 7 is a flowchart illustrating a speculative LDSTQ and a speculative allocation process of an LDSTQ in a processor core of an exemplary of the embodiment.

(B) Operation:

Description will now be made in relation of a process of allocating a speculative LDSTQ 161 and a speculative STDQ 164 in the processor core 10 as an embodiment configured as described above with reference to the flowchart of FIG. 7 (Steps A1-A5).

The decoder 13 obtains an instruction from the instruction buffer 12 and decodes the obtained instruction (instruction interpretation).

In Step A1, the decoder 13 confirms whether the decoded instruction is a load instruction. In case where the instruction is a store instruction as a result of the confirmation (see Yes route in Step A1), the process proceeds to Step A4.

In Step A4, the provisional allocation manager 131 provides a speculative LDSTQ and increments the speculative LDSTQ number by one. The decoder 13 also provides the load instruction with information of the resource of the STDQ 164 allocated to the store instruction decoded the most recently. Then, the process proceeds to Step A5.

If, as a result of the confirmation in Step A1, the instruction is not a load instruction (see No route in Step A1), the process proceeds to Step A2.

In Step A2, the decoder 13 confirms whether the decoded instruction is a store instruction. If cases where the instruction is a store instruction (see Yes route in Step A2), the process proceeds to Step A3.

In Step A3, the provisional allocation manager 131 provides a speculative LDSTQ and a speculative STDQ and increments the speculative LDSTQ number and speculative STDQ number by one. Then, the process proceeds to Step A5.

In cases where the instruction is not a store instruction (see No route in Step A2) as a result of the confirmation in Step A2, the process also proceeds to Step A5.

In Step A5, the decoder 13 accumulates the decoded instruction, along with other decoding results, in the reservation station 14. Then, the process ends.

Figure 8:
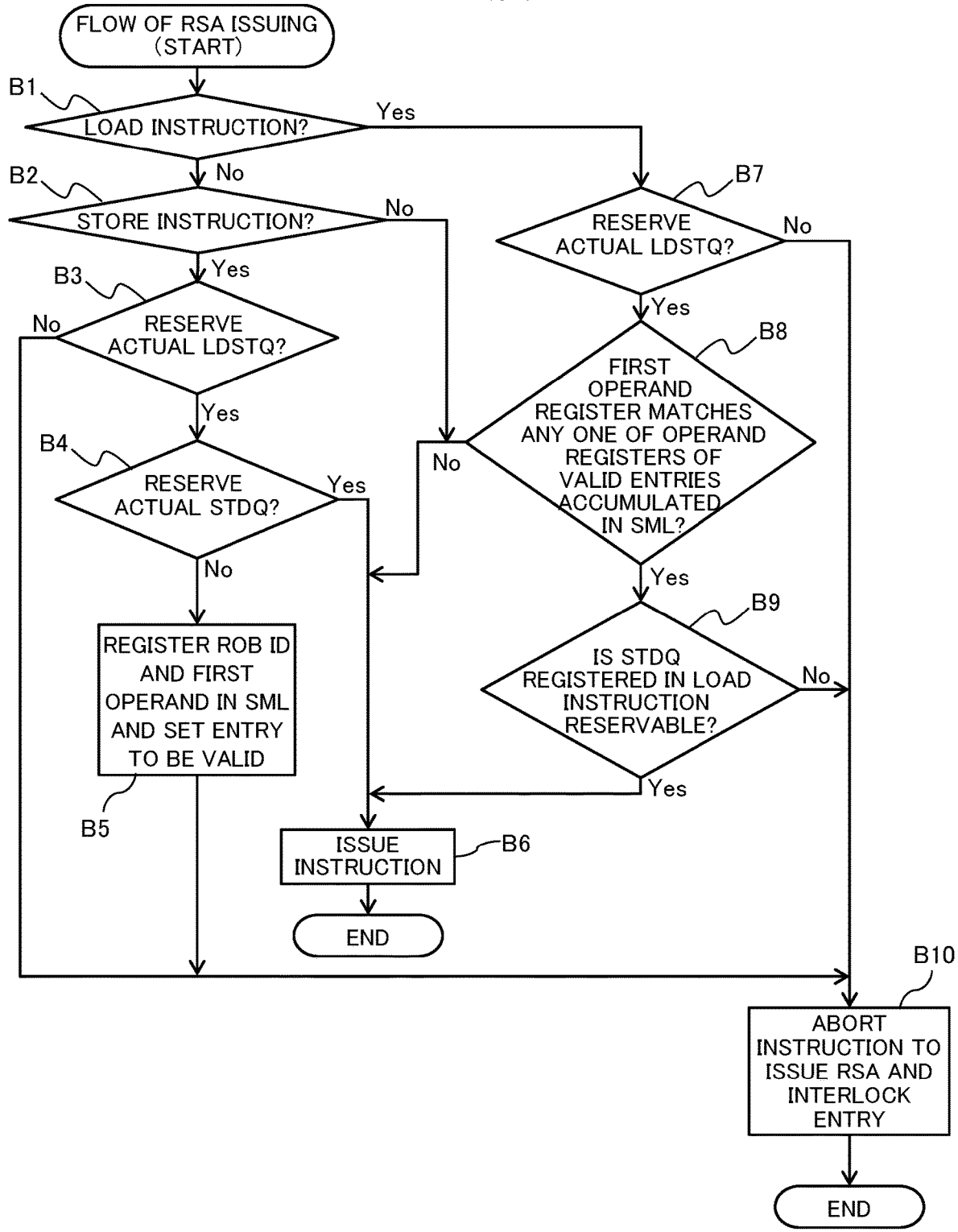
FIG. 8 is a flowchart illustrating a process of issuing an instruction from an RSA in a processor core of an example of the embodiment.

Next, description will now be made in relation to a process of issuing an instruction from the RSA 141 in the processor core 10 as an example of an embodiment with reference to a flowchart of FIG. 8 (Steps B1-B10).

In step B1, the actual allocation manager 143 confirms whether an instruction issued by the RSA 141 is a load instruction. In cases where the instruction is not a load instruction (see No route in Step B1) as a result of the confirmation, the process proceeds to Step B2.

In Step B2, the actual allocation manager 143 confirms whether the instruction issued by the RSA 141 is a store instruction. In case where the instruction is a store instruction as a result of the confirmation (see Yes route in Step B2), the process proceeds to Step B3.

In Step B3, the actual allocation manager 143 confirms whether an actual resource of the LDSTQ 161 has been reserved. As a result of the confirmation, in cases where the actual resource of the LDSTQ 161 is reserved (see Yes route in step B3), the process proceeds to Step B4.

In step B4, the actual allocation manager 143 then confirms whether an actual resource of the STDQ 164 is reserved. If, as a result of checking, the actual resource of the STDQ 164 is unable to be reserved (see No route in Step B4), the process proceeds to Step B5.

In Step B5, the actual allocation manager 143 registers the first operand and the ROB ID into the SML 144 and sets the value 1 representing valid into the valid/invalid information of the entry corresponding to the registered operand and ID.

Specifically, in cases where the instruction selected in RSA 141 is a store instruction and resource allocation of the LDSTQ 161 and the STDQ 164 fails, the actual allocation manager 143 adds, to the SML 144, the first operand register number to be used in address calculation for the instruction and the ROB ID fails in the resource allocation. Furthermore, the actual allocation manager 143 marks the added entry to be valid.

If a store instruction fails to allocate the resources of the LDSTQ 161 and the STDQ 164 under a state where all the entries of SML 144 are marked to be valid (1), the actual allocation manager 143 may overwrite and register each valid entry of the SML 144.

Then, in Step B10, the actual allocation manager 143 aborts issuing of an instruction from the RSA 141 and interlocks the entry.

That is, the store instruction is interlocked until the STDQ 161 is released because the actual STDQ 164 is unable to be reserved. Then, the process ends.

On the other hand, in cases where the actual resource of the STDQ 164 is reserved as a result of confirmation in Step B4, (see Yes route in Step B4), a store instruction is issued in Step B6.

That is, if the actual resources of the LDSTQ 161 and the STDQ 164 are allocated successfully, the operand register number is sent to the fixed-point register 151 and the address calculator 152 carries out the address calculation. Then, the store instruction is registered in LDSTQ 161 and STDQ 164.

The actual allocation manager 143 notifies the SML 144 of the ROB ID when the allocation of the store instruction to the LDSTQ 161, and the STDQ 164 is fixed. Then, the process ends.

In cases where the actual resource of the LDSTQ 161 is not reserved as a result of the confirmation in Step 33, (see No route in Step B3), the process proceeds to Step B10.

As a result of the confirmation in Step B2, in cases where the instruction is not a store instruction (see No route in Step B2), the process proceeds to Step B6.

On the other hand, if, as a result of checking in step 31, the instruction is a load instruction (see Yes route in Step B1), the process proceeds to Step B7.

In Step B7, actual allocation manager 143 confirms that the actual resources of the LDSTQ 161 have been reserved. If, as a result of checking, the actual resources of the LDSTQ 161 is not reserved (see No route in Step B7), the process proceeds to Step B10.

In cases where the actual resource of the LDSTQ 161 is reserved successfully as a result of the confirmation in Step B7 (see Yes route in Step B7), the process proceeds to Step B8.

In Step B8, the actual allocation manager 143 compares the first operand register number of the load instruction with the first operand register number registered in all the valid entries of SML 144 to determine whether the first operand register number of the load instruction matches any of the first operand registers.

In cases where a matching entry exists as a result of the comparison (see Yes route in Step B8), the process proceeds to Step B9. In Step B9, the actual allocation manager 143 confirms (checks) whether the STDQ 161 of the preceding store instruction provided to the load instruction by the decoder 13 is reservable. This confirmation is made in the same manner as the confirmation as to whether the store instruction successfully reserves the actual resource made in Steps B3 and B4.

In cases where the actual STDQ 164 is not reservable for the load instruction (see No route in Step B9), the process proceeds to Step B10. In Step B10, like the case where the LDSTQ 161 is not reserved, the load instruction is interlocked until the STDQ 164 is released because the actual STDQ 164 is not reserved.

On the other hand, in cases where the actual STDQ 164 is reservable for the load instruction (see Yes route in Step B9), the process proceeds to Step B6.

Furthermore, in cases where the first operand register number of the load instruction does not match any of the first operand register numbers registered in the valid entries of the SML 144 as a result of the confirmation in step B8 (see No route in step B8), the process proceeds to Step 36.

In cases where allocation of the actual resource of the LDSTQ 161 succeeds and the first operand register number of the load instruction does not match the first operand register number registered in each of the valid entries of the SML 144, the register numbers of the valid entries are sent to fixed-point register 151. After that, the address calculator 152 performs the address calculation and registers the load instruction into the LDSTQ 161.

Here, when the load/store unit 16 completes reading data from the main memory 2, the LSCU 163 notifies the decoder 13 and the RSA 141 of a release notification of the LDSTQ 161, and sends an ROB ID and a memory reading completion notification to the ROB 17.

Interlocking of an entry that is being interlocked by the RSA 141 because the entry is waiting for allocation of the actual resource of the LDSTQ 161 is cancelled when the RSA 141 receives the release notification, and the entry comes into a state of being issuable from the RSA 141.

When the preparation flow of the store instruction is completed in the load/store unit 16, the load/store unit 16 sends an ROB ID and preparation completion notification of the store instruction to the ROB 17 and the SML 144.

When the ROB 17 is notified of the preparation completion of the storing and determines that the instructions are ready to be completed in the order of the program, the ROM 17 sends a store instruction to the load/store unit 16. Upon receipt of the store instruction, the LSCU 163 writes the data held in the STDQ 164 into the main memory 2.

The LSCU 163 sends release notification to the decoder 13 and the RSA 141 when determining that the use of the resources of the LDSTQ 161 and the STDQ 164 is finished. Interlocking of an entry that is being interlocked by the RSA 141 because the entry is waiting for allocation of the actual resource of the LDSTQ 161 or the STDQ 164 is cancelled when release notification is issued to the RSA 141, and the entry comes into a state of being issuable from the RSA 141.

The SML 144 invalidates the entry matching the ROB ID of an entry registered in the SML 144 using an ROB ID that is notified when allocation of the store instruction to the LDSTQ 161 and the STDQ 164 is fixed.

Even if a store instruction which is unable to reserve an actual. STDQ 164 is interlocked by the RSA 141 and is not issued, the above processes makes it possible to guarantee the order of the instructions by interlocking a load instruction when the subsequent first operand register numbers match.

On the other hand, a load instruction whose first operand register number does not match is not interlocked, but is executed out-of-order. This allows selective interlocking of only the load instruction that has a possibility of overriding the store instruction that might have matching addresses, as compared with interlocking all load instructions subsequent to the store instruction does not reserve the STDQ 164.

Figure 9:
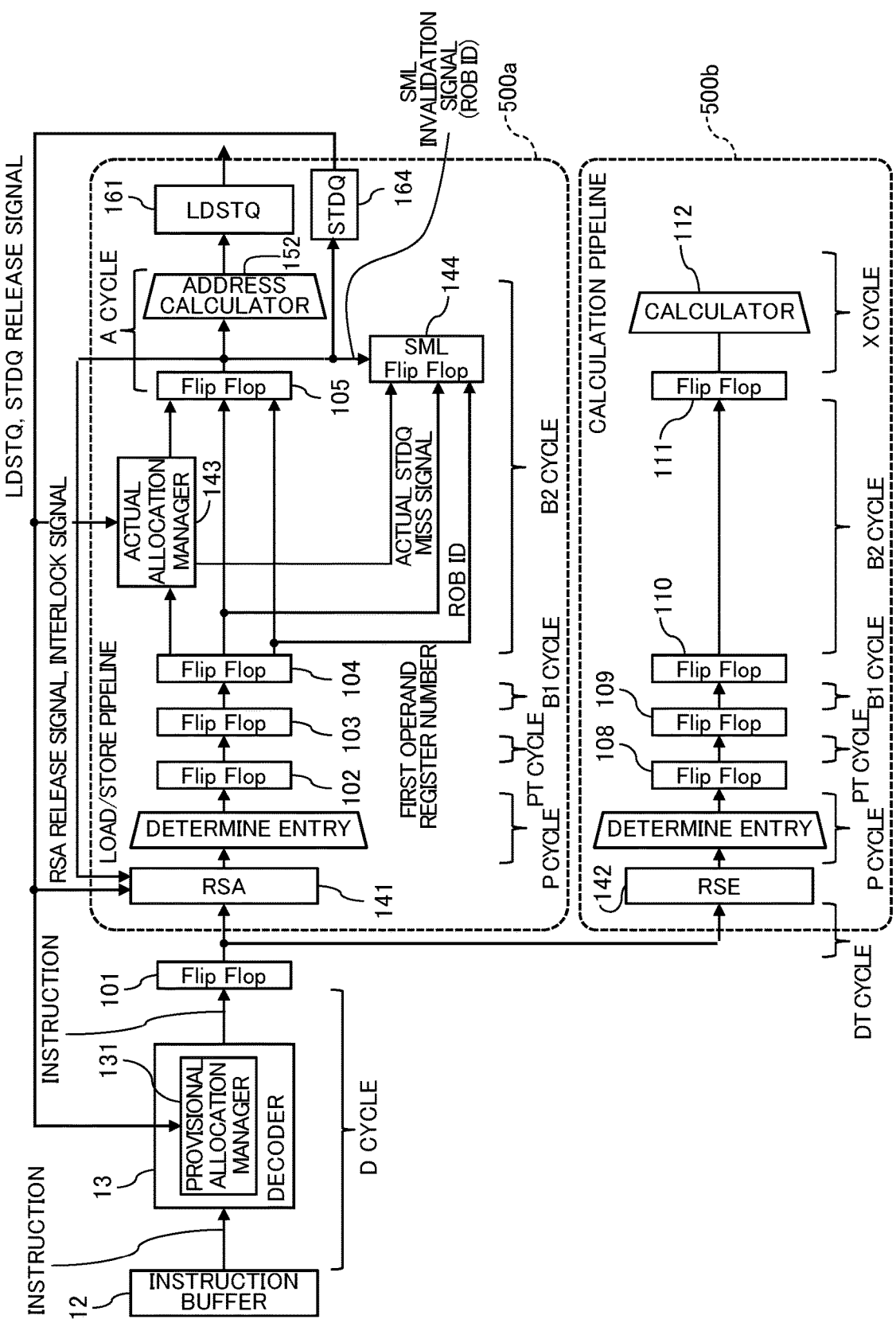
FIG. 9 is a diagram illustrating an instruction pipeline dealing with a store instruction in a processor core of an example of the embodiment.
Figure 10:
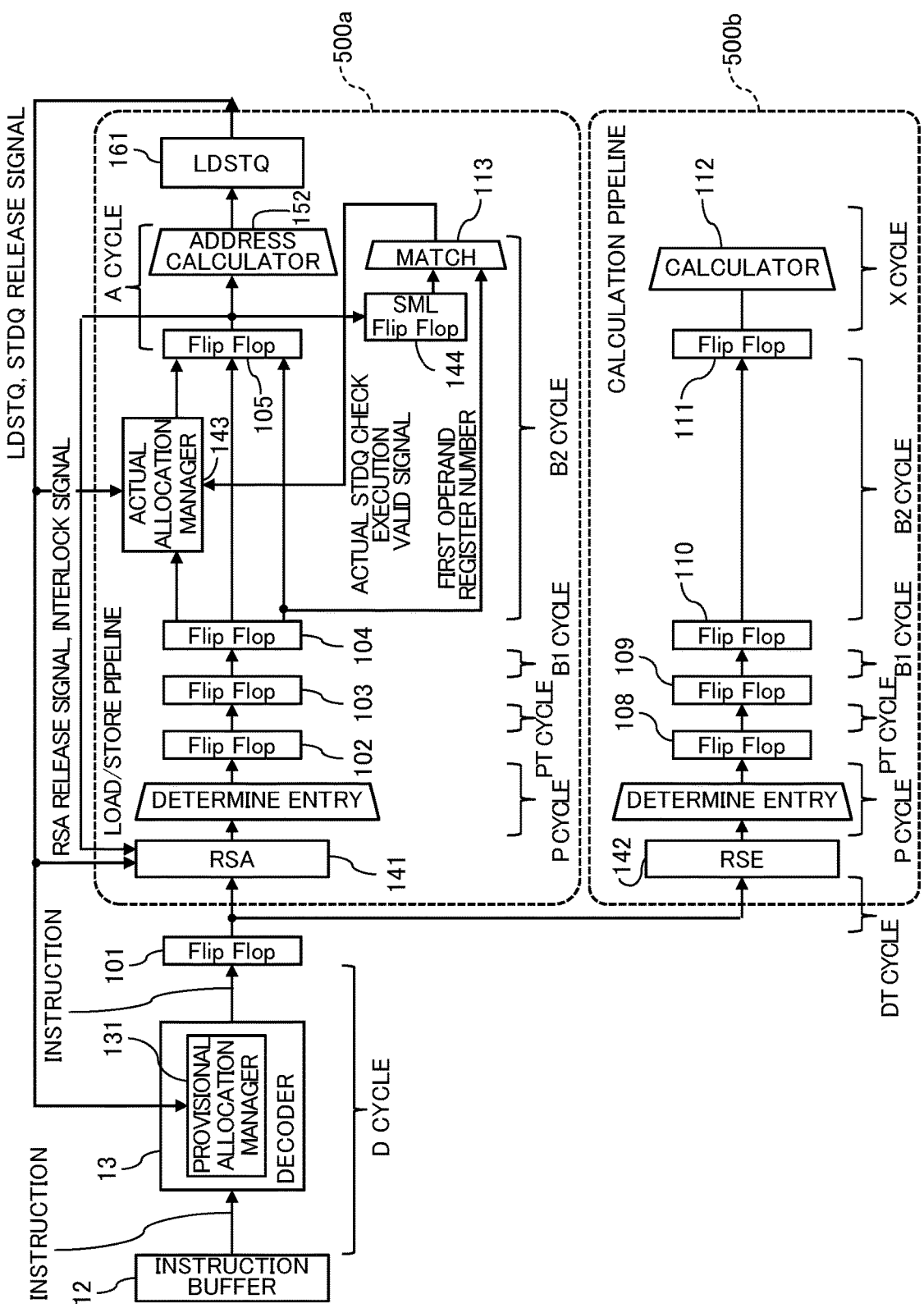
FIG. 10 is a diagram illustrating an instruction pipeline dealing with a load instruction in a processor core of an example of the embodiment.

FIG. 9 is a diagram illustrating an instruction pipeline dealing with a store instruction in the processor core 10 as an example of the embodiment, and FIG. 10 is a diagram illustrating an instruction pipeline dealing with a load instruction.

The instruction pipeline has multiple processing stages (pipeline stages).

The load/store instruction is executed in five stages of the load/store pipeline 500a called a P (Priority) cycle, a PT (Priority Transfer) cycle, a B (Buffer) 1 cycle, a B (Buffer) 2 cycle, and an A (Address Generate) cycle. The load/store pipeline 500a corresponds to the path from the RSA 141 to the LDSTQ 161 in FIG. 4.

A fixed-point calculation instruction is executed in a calculation pipeline 500b of five stages of the P cycle, the PT cycles, the B1 cycle, the B2 cycle, and an X (Execution) cycle. The D (Decode) cycle and the DT (Decode Transfer) cycle are common to the both pipelines.

During the D cycle, the decoder 13 decodes an instruction and sends the decoded instruction to the reservation station 14. The decoder 13 also manages the number of LDSTQs 161 and STDQs 164 and speculatively allocates the LDSTQ 161 and the STDQ 164 to an instruction.

During the DT cycle, the instruction decoded in the D cycle is forwarded and stored into reservation station 14.

In the P cycles, an instruction (entry) to be inserted from the reservation station 14 to the address calculator 152 or calculator 112 is determined.

In the PT cycle, data of the P cycles is forwarded. In the B1 cycle, the data required for the address generation calculation is determined. In addition, the register 151 is read.

In the B2 cycle, the data required for the address generation calculation is determined. This means that this determination is a continuation of the B1 cycle. In cases where the instruction is a store instruction, the LDSTQ 161 and the STDQ 164 allocated speculatively in D cycles are checked whether to have empty spaces. Furthermore, an entry is registered into the SML 144 or an entry registered in the SML 144 is checked.

In the A cycle, the address generation calculation is performed. Then the generated address is sent to the load/store unit 16. In addition, the reservation station 14 is released. In cases where the instruction is a store instruction, a signal (SML invalidation signal, ROB ID) to invalidate the entry is issued to the SML 144. A request is issued to the load/store unit 16 and the request is registered into the LDSTQ 161 and the STDQ 164. In the X cycle, fixed-point calculation is performed.

In addition to checking the actual LDSTQ 161 and STDQ 164, the instruction pipeline of the processor core 10 includes the SML 144. The instruction registered in the SML 144 is a store instruction, and the instruction that uses the information registered in the SML 144 is a load instruction.

First, the instruction pipeline that deals with a store instruction in the processor core 10 according to an embodiment will be described with reference to FIG. 9.

When a store instruction is inputted from the instruction buffer 12 to the decoder 13 in the D cycle, the decoder 13 decodes the input instruction and the provisional allocation manager 131 allocates a speculative LDSTQ 161 and STDQ 164 to the input instruction.

The decoder 13 outputs the decoded store instruction to flip-flop 101 for transmission to the RSA 141 of the reservation station 14.

Here, speculative allocation is the allocation of identification information obtained by virtually increasing the entry numbers of the LDSTQ 161 or the STDQ 164, as virtual entries, to a load/store instruction.

In the DT cycle, the instruction is registered into the RSA 141. Specifically, the instruction decoded in the D cycle is forwarded through flip-flop 101 to be stored in the RSA 141 of the reservation station 14.

The RSA 141 selects an instruction to be issued in the out-of-order fashion in P cycles. Accordingly, the oldest entry is selected from among the instructions that have come to be able to be issued. In cases where a store instruction is selected in the RSA 141, the instruction is sent to the PT cycle and then sequentially proceeds to the B1 cycle and the B2 cycle.

In the PT cycle, the instruction code of the instruction determined in the P cycle is forwarded from the flip-flop 102 to the flip-flop 103.

In the B1 cycle and the B2 cycle, the data is delayed by the flip-flops 103 to 105 in agreement with the timings when data is read from the fixed-point registers (GPRs). At the same time, the actual allocation manager 143 checks whether or not the entry of the LDSTQ 161 corresponding to the entry provisionally allocated in D cycle actually has an empty space by using the LDSTQ release signal output from the LDSTQ 161.

In the B2 cycle, if the LDSTQ 161 is available but STDQ 164 is not available, the actual allocation manager 143 sends an actual STDQ miss signal to the SML 144.

When being notified of the actual STDQ miss signal, the SML 144 records the ROB ID and the first operand register number of the store instruction into an invalid entry by overwriting. If there are no invalid entry in the SML 144, that is, if the SML 144 is filled with valid entries, any one of the entries may be overwritten, or none may be overwritten. The store instruction attached with information representing whether both the LDSTQ 161 and the STDQ 164 are available is sent to the ensuring A cycle.

If an entry of the LDSTQ 161 is empty, the actual allocation manager 143 outputs the instruction code to be input into the address calculator 152 to the flip-flop 105. On the other hand, if the entries of the LDSTQ 161 are not empty, the actual allocation manager 143 outputs the instruction code to be returned to the RSA 141 to the flip-flop 105 and also outputs an interlocking signal to the flip-flop 105.

In addition, the store data read in the B1 cycles is registered in the STDQ 164 of the load/store unit 16. Then an RSA release signal, which indicates that the instruction is successfully issued, is sent to the RSA 141.

In addition, the ROB ID and SML invalidation signal are sent to the SML 144. Upon receipt of the SML invalidation signal, the SML 144 searches for an entry that matches the registered ROB ID and, if the entry is present, marks a signal representing the validity or invalidity of the entry to be invalid.

In the A cycle, if both the LDSTQ 161 and the STDQ 164 are available, the address generation calculation is performed using the register read in the B1 cycle in B2 cycle, and the calculation result is registered in the LDSTQ 161 of the load/store unit 16.

If neither the LDSTQ 161 nor the STDQ 164 is available in the A cycle, the store instruction is canceled and an interlocking signal is sent to the RSA 141. Upon receipt of the interlocking signal, the RSA 141 interlocks the corresponding store instruction and excludes this store instruction from the selection of instructions to be issued in the out-of-order fashion in the P cycle.

If the store instruction is not canceled in the A cycle, the load/store unit 16 sends release signal (LDSTQ and STDQ release signal) to the RSA 141 and the actual allocation manager 143 when the store instruction is completed and the LDSTQ 161 and the STDQ 164 are releasable. The RSA 141 cancels the interlocking of the interlocked entry and joins the entry into selection of instructions to be issued in the out-of-order fashion in the P cycle.

The address calculator 152 performs address generation calculation and sends the generated address and a load/store instruction to the LDSTQ 161. After outputting the address to the data cache 162, the LDSTQ 161 outputs the LDSTQ and STDQ release signal to the RSA 141 and to the actual allocation manager 143.

Next, the instruction pipeline dealing with a load instruction in the processor core 10 as an example of the embodiment will be described with reference to FIG. 10.

When a load instruction is inserted into the decoder 13 from the instruction buffer 12 in the D cycle, the decoder 13 decodes the obtained instruction and a speculative LDSTQ 161 is allocated to the instruction by the provisional allocation manager 131.

Here, speculative allocation represents that identification information obtained by virtually increasing the entry number of the LDSTQ 161 is allocated as a virtual entry, to the load instruction.

The decoder 13 also provides the number of the speculative STDQ 164 allocated to the store instruction decoded immediately before the decoding of this load instruction to the load instruction, and sends the load instruction to the DT cycle.

In the DT cycle, the instruction is registered into the RSA 141. The load instruction decoded in the D cycle is forwarded through the flip-flop 101 and stored into the RSA 141 of the reservation station 14.

The RSA 141 selects an instruction to be issued in the out-of-order fashion in P cycles. Accordingly, the oldest entry is selected from among the instructions that have come to be issuable. When a load instruction is selected in the RSA 141, the load instruction is sent to the PT cycle and then sequentially proceeds to the B1 cycle and the B2 cycle.

In the PT cycle, the instruction code of the instruction determined in the P cycle is forwarded from the flip-flop 102 to the flip-flop 103.

In the B1 cycle and the B2 cycle, the data is delayed by the flip-flops 103 to 105. At the same time, the actual allocation manager 143 checks whether or not the entry of the LDSTQ 161 corresponding to the entry provisionally allocated in the D cycle actually has an empty space by using the LDSTQ release signal output from the LDSTQ 161.

In the B2 cycle, a match circuit 113 compares the first operand register number of the load instruction with the first operand number of valid entries registered in SML 144. If one or more matching entries are present in the SML 144, the match circuit 113 sends an actual STDQ check execution valid signal to the actual allocation manager 143.

If the actual STDQ check execution valid signal indicates to be valid, the STDQ 164 allocated to the immediate previous store instruction in the D cycle is also checked whether to be available. That is, the present processor core 10 selectively interlocks only a load instruction issued after a store instruction.

On the other hand, if the actual. STDQ check execution valid signal indicates to be invalid, the STDQ 164 is determined to be always available. The load instruction attached with information representing whether both the LDSTQ 161 and the STDQ 164 are available is sent on the ensuring A cycle.

In the A cycle, if both the LDSTQ 161 and the STDQ 164 are available, the address generation calculation is performed in the B2 cycle using the register 151 read in the B1 cycle, and the calculation result is registered in the LDSTQ 161 of the load/store unit 16. Then an RSA release signal, which indicates that the instruction is successfully issued, is sent to the RSA 141.

If neither the LDSTQ 161 nor the STDQ 164 is available in the A cycle, the load instruction is canceled and an interlock is sent to the RSA 141. When the RSA 141 receives the interlocking signal, the RSA 141 interlocks the corresponding load instruction and excludes this load instruction from the selection of instructions to be issued in the out-of-order fashion in P cycles.

If the load instruction is not canceled in the A cycle, the load/store unit 16 sends a release signal to the RSA 141 and the actual allocation manager 143 when the load instruction is completed and the LDSTQ 161 comes to be releasable. The RSA 141 cancels the interlocking of the interlocked entry and joins the entry into selection of instructions to be issued in the out-of-order fashion in the P cycle.

Figure 11:
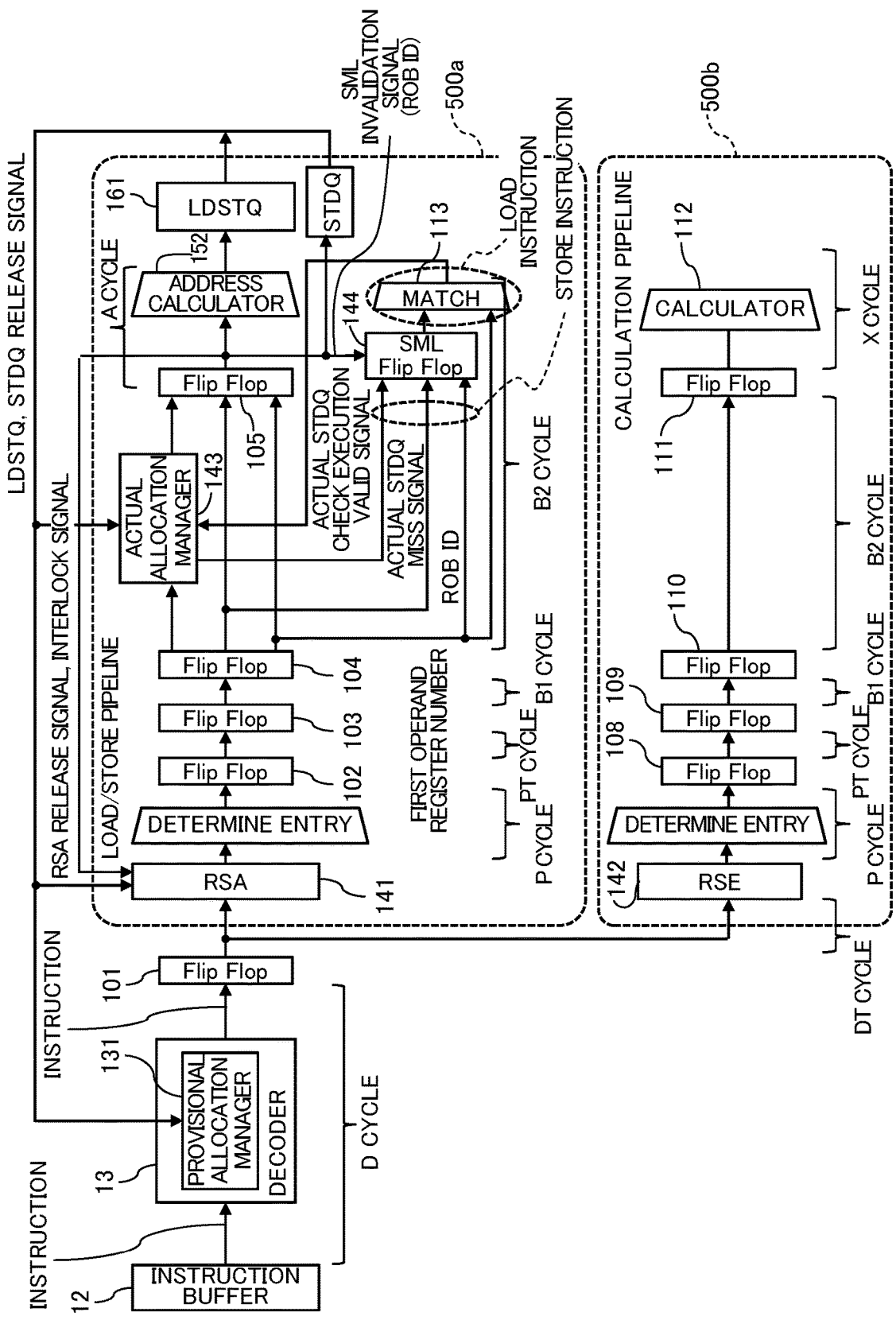
FIG. 11 is a diagram illustrating the instruction pipeline dealing with a store instruction illustrated in FIG. 9 and the instruction pipeline dealing with a load instruction illustrated in FIG. 10 in combination.

FIG. 11 is a diagram illustrating the instruction pipeline dealing with a store instruction illustrated in FIG. 9 and the instruction pipeline dealing with a load instruction illustrated in FIG. 10 in combination In the present processor core 10, when LDSTQ 161 was available but the STDQ 164 was not available during store instruction processing, the SML 144 records the ROB ID and the first operand register number of the store instruction into an entry.

When the load instruction is to be processed, the first operand register number of the load instruction is compared with the first operand number of valid entries registered in the SML 144. If one or more matching entries are present in the SML 144, the processor core 10 interlocks a load instruction to be issued after the store instruction.

Accordingly, in cases where the target address of the store instruction and the target address of the load instruction match, this prevents the subsequent load instruction from being issued earlier than the store instruction while the store instruction is waiting for allocation of an actual STDQ 164 in the reservation station 14.

(C) Effect:

As described above, the processor core 10 according to an embodiment of the present invention includes the SML 144 and, in cases where a store instruction reserves an actual resource of the LDSTQ 161 but does not reserve an actual resource of the SRDQ 164, registers the first operand register number and the ROB ID into the SML 144.

When a load instruction is issued from the reservation station 14, the actual allocation manager 143 confirms whether any first operand register number registered in the SML 144 matches the first operand register number used by the load instruction.

If there is a matching entry as a result of the confirmation, the actual allocation manager 143 cancels execution of the load instruction and interlocks the load instruction until the resource in the reservation station 14 is released.

Accordingly, in a pattern in which the target address of the store instruction and the target address of the load instruction match which pattern frequently appears in the program, this prevents the subsequent load instruction from being issued earlier than the store instruction while the store instruction is waiting for allocation of an actual STDQ in the reservation station 14. Therefore, it is possible to reduce the risks of re-issuing instructions due to the switching a store instruction and a load instruction.

In addition, it is possible to prevent the switching of the order of a store instruction and a load instruction simply by increasing small circuitry of the SML 144 having a queue structure of a relatively small in circuit scale.

(D) Miscellaneous:

The present invention is not limited to the above-described embodiment and may be implemented in a variety of variations without departing from the scope of the invention.

For example, the foregoing embodiment registers the ROB ID along with the first operand register number in the SML 144, but the present invention is not limited to this. Alternatively, the ROB ID may be replaced with other identification information and may be appropriately modified and implemented.

Also, the embodiments described above may be implemented and manufactured by those skilled in the art.

According to one embodiment, the switching of the order of a store instruction and a load instruction can be inhibited.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A calculation processing apparatus comprising:
    a decoder that decodes memory access instructions including a store instruction to store a piece of store data and a load instruction;
    a first queue comprising a plurality of first entries, the decoded memory access instructions being written one into each of the plurality of first entries;
    a second queue comprising a plurality of second entries, the plurality of second entries being previously reserved when the store data is written into the plurality of second entries, the store data being written into the plurality of second entries being in a reserved state, each single piece of the store data being written into a single second entry;
    a storage circuit that stores target address information of the store instruction to store the piece of the store data in a case where an entry of the first queue is reserved to store the decoded store instruction but an entry of the second queue to store the piece of the store data is not reserved; and
    an allocation manager that inhibits execution of the load instruction when address information matching target address information of the load instruction is stored in the storage circuit when the load instruction is being processed.

2. The calculation processing apparatus according to claim 1, wherein the allocation manager registers, when the entry of the first queue is reserved to store the decoded store instruction but the entry of the second queue to store the piece of the store data related to the store instruction is not reserved for the store instruction when the store instruction is being processed, the target address information of the store instruction into the storage circuit.

3. The calculation processing apparatus according to claim 1, further comprising a reservation station for an address that stores the memory access instructions decoded by the decoder and outputs the stored memory access instructions to a calculation executor that processes the memory access instructions, wherein the allocation manager interlocks an entry of the reservation station for the address until the entry of the second queue is released.

4. A control method of a calculation processing apparatus that includes a decoder that decodes memory access instructions including a store instruction to store a piece of store data and a load instruction; a first queue; and a second queue comprising a plurality of second entries, the plurality of second entries being previously reserved when the store data is written into the plurality of second entries, the store data being written into the plurality of second entries being in a reserved state and each single piece of the store data being written into a single second entry, the method comprising:
    comparing first target address information of the load instruction with second target address information of the store instruction stored in a storage circuit that stores the second target address information in a case where an entry of the first queue is reserved to store the decoded store instruction but an entry of the second queue to store the piece of the store data is not reserved; and
    inhibiting, when address information matching the first target address information of the load instruction is stored in the storage circuit, execution of the load instruction.

5. The control method according to claim 4, further comprising registering, when the entry of the first queue is reserved to store the decoded store instruction but the entry of the second queue to store the piece of the store data related to the store instruction is not reserved for the store instruction when the store instruction is being processed, the second target address information of the store instruction into the storage circuit.

6. The control method according to claim 4, further comprising interlocking an entry of a reservation station for an address that stores the memory access instructions decoded by the decoder and outputs the stored memory access instructions to a calculation executor that processes the memory access instructions until the entry of the second queue is released.

* * * * *